United States Patent [19]

Lutz

[11] Patent Number: 5,310,305

[45] Date of Patent: * May 10, 1994

[54] APPARATUS FOR LOADING AND UNLOADING OBJECTS

[75] Inventor: David W. Lutz, Carlisle, Pa.

[73] Assignee: Master Manufacturers, Inc., Carlisle, Pa.

[*] Notice: The portion of the term of this patent subsequent to Jun. 4, 2008 has been disclaimed.

[21] Appl. No.: 757,590

[22] Filed: Sep. 11, 1991

[51] Int. Cl.$^5$ .................................. B60K 1/04
[52] U.S. Cl. ................................ 414/609; 74/89.2
[58] Field of Search ............... 74/89.2, 89.22; 414/345, 390, 391, 392, 398, 399, 609, 610

[56] References Cited

U.S. PATENT DOCUMENTS

| 3,047,095 | 7/1962 | Bell et al. | 74/89.21 X |
| 4,265,582 | 5/1981 | Theobold | 414/281 X |
| 4,450,400 | 5/1984 | Gwyn | 414/373 X |
| 4,966,513 | 10/1990 | Motoda | 414/609 X |
| 5,020,382 | 6/1991 | Lutz | 74/89.2 |
| 5,160,237 | 11/1992 | Lutz | 414/609 |

FOREIGN PATENT DOCUMENTS

| 0188236 | 11/1983 | Japan | 414/399 |
| 0231711 | 10/1989 | Japan | 414/392 |

Primary Examiner—Michael S. Huppert
Assistant Examiner—Stephen T. Gordon

[57] ABSTRACT

Apparatus for loading and unloading objects including a base (10, 30); a gantry (20, 40) mounted on the base (10,30) and projecting upwardly therefrom; a first carriage (12,32) mounted on the base (10,30); a drive mechanism for moving the first carriage (12,32) back and forth in a straight line on the base (10,30) between a first position and a second position: a second carriage (16,36) mounted on the gantry (20,40); a second drive mechanism for moving the second carriage (16,36) back and forth between a first position that is at least substantially identical to the second position of the first carriage (12,32) and a second position that is at least substantially vertically spaced from the first position of the first carriage (12,32); and a mechanism for interrelating the first drive mechanism and the second drive mechanism such that, when the first carriage (12,32) is in its first position, the second carriage (16,36) is in its first position; as the first carriage (12,32) moves from its first position to its second position, the second carriage (16,36) moves from its first position to its second position; when the first carriage (12,32) is in its second position, the second carriage (16,36) is in its second position; and, as the first carriage (12,32) moves from its second position to its first position, the second carriage (16,36) moves from its second position to its first position.

13 Claims, 3 Drawing Sheets

APPARATUS FOR LOADING AND UNLOADING OBJECTS

FIELD OF THE INVENTION

This invention relates to apparatus for loading and unloading objects such as palletized loads. In particular, it relates to such apparatus in which two carriages alternate between two positions, such as a loading/unloading station on an assembly line and a position providing access to the lift of a truck.

BACKGROUND OF THE INVENTION

Palletized loads are often loaded and unloaded using a plurality of carriages that alternate between two positions on a continuous looped track, which may be either on a horizontal plane (like a race track) or in a vertical plane (like a ferris wheel). While both these layouts are relatively simple mechanically, they consume relatively large amount of floor space. Accordingly, a need has been apparent for apparatus for alternating a plurality of carriages between two positions that would consume less floor space, even at the cost of some increase in the complexity of the mechanisms involved.

An important solution to this problem was provided by the apparatus disclosed in my previous patent, U.S. Pat. No. 5,020,382, issued Jun. 4, 1991. Since that invention is related to the present invention, the disclosure of that patent is hereby incorporated herein by reference.

The invention disclosed in my previous patent interchanges the positions of two carriages. That is, if two carriages A and B start off in the positions X and Y, respectively, after one sequence of operations the carriage A has moved to the position Y and the carriage B has moved to the position X. Then, after another sequence of operations, the carriage A returns to the position X, and the carriage B returns the position Y. If the position X is, for instance, an off loading position, and the position Y is an on loading position, that is entirely satisfactory in many (probably most) situations.

However, it is sometimes desired to have both of the carriages alternately occupy a single position during a first stage of operations, but each carriage occupy a different, vertically spaced position at a second stage of operations. That is, if the two carriages A and B start off in the positions X and Y, respectively, after one sequence of operations the carriage A has moved to the position Y, and the carriage B has moved to the position $X^1$, which is vertically spaced relative to the position X. Then, after another sequence of operations, the carriage A returns the position X, and the carriage B returns to the position Y. The positions X and $X^1$ can be either off loading positions or on loading positions, depending on the desired use of the apparatus.

OBJECTS OF THE INVENTION

It is the principal object of this invention to provide apparatus for alternating each of two carriages between two positions, one of which is common to the two carriages and one of which is spaced vertically relative to the second position of the other carriage.

It is another object of the invention to provide such apparatus which is as sturdy as possible, which employs hardware that is not prone to mechanical failure, and which requires relatively little maintenance.

It is still another object of the invention to provide such apparatus which requires less operator time to operate than do prior art devices.

SUMMARY OF THE INVENTION

With the foregoing in mind, the apparatus for loading and unloading objects according to the invention includes a base; a gantry mounted on the base and projecting upwardly therefrom; a first carriage mounted on the base; first means for moving the first carriage back and forth in a straight line on the base between a first position and a second position; a second carriage mounted on the gantry; second means for moving the second carriage back and forth between a first position that is at least substantially identical to the second position of the first carriage and a second position that is at least substantially vertically spaced from the first position of the first carriage; and third means for interrelating the first means and the second means such that, when the first carriage is in its first position, the second carriage is in its first position; as the first carriage moves from its first position to its second position, the second carriage moves from its first position to its second position; when the first carriage is in its second position, the second carriage is in its second position; and, as the first carriage moves from its second position to its first position, the second carriage moves from its second position to its first position.

DETAILED DESCRIPTION OF THE PRESENTLY PREFERRED EMBODIMENTS

The First Embodiment

Figure 1:
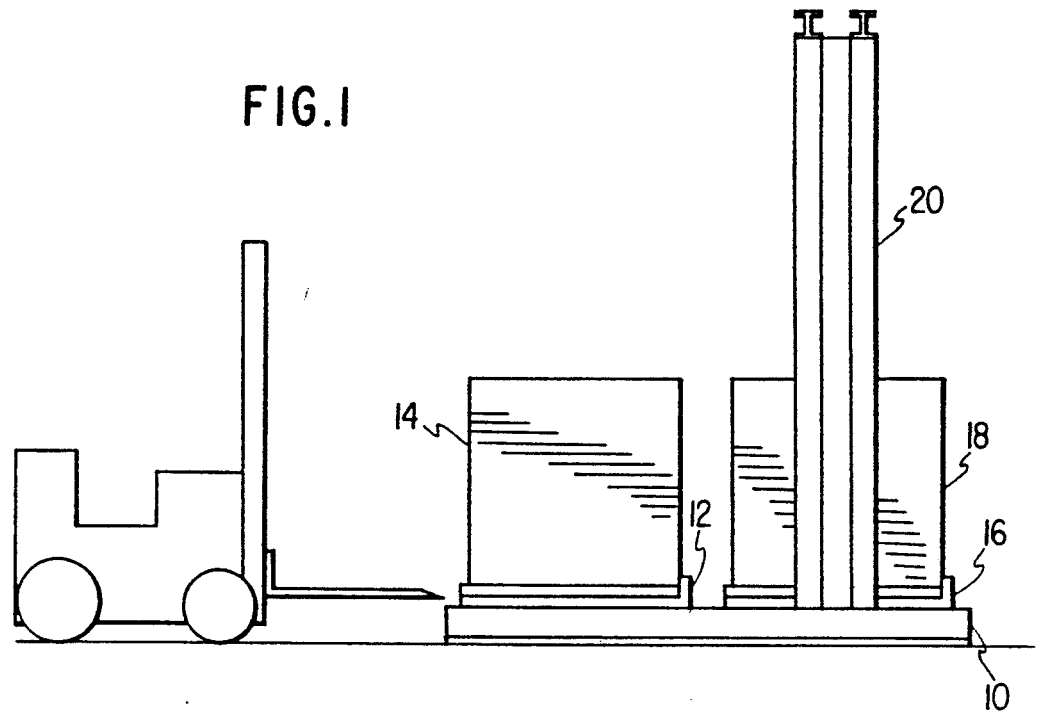
FIG. 1 is a schematic side view of a first embodiment of the invention showing the first carriage in its first position and the second carriage in its first position.
Figure 2:
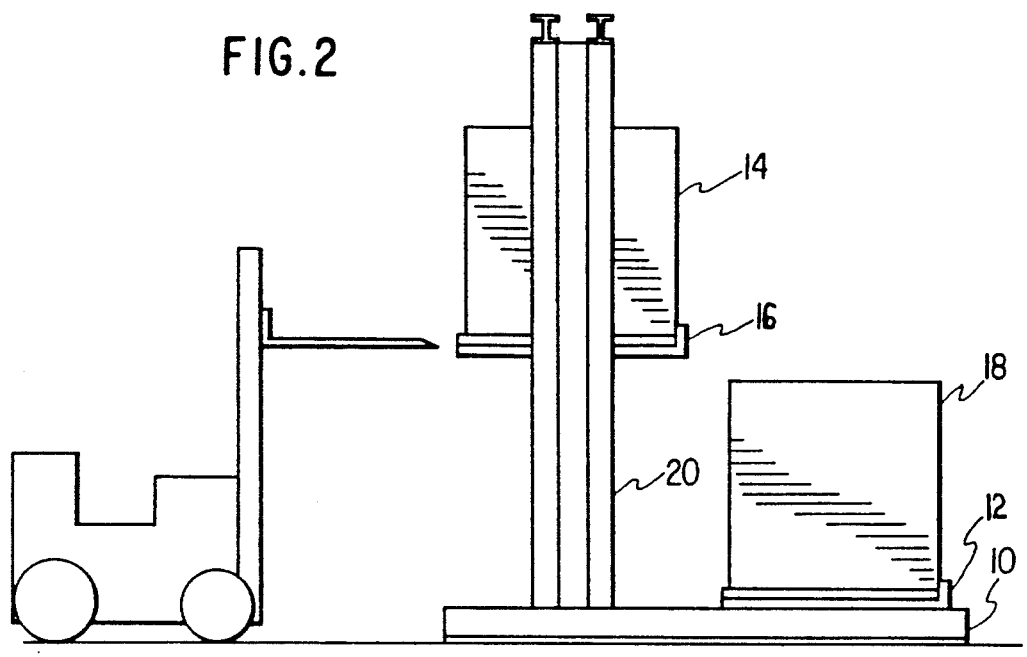
FIG. 2 is a schematic side view of the first embodiment of the invention showing the first carriage in its second position and the second carriage in its second position.
Figure 3:
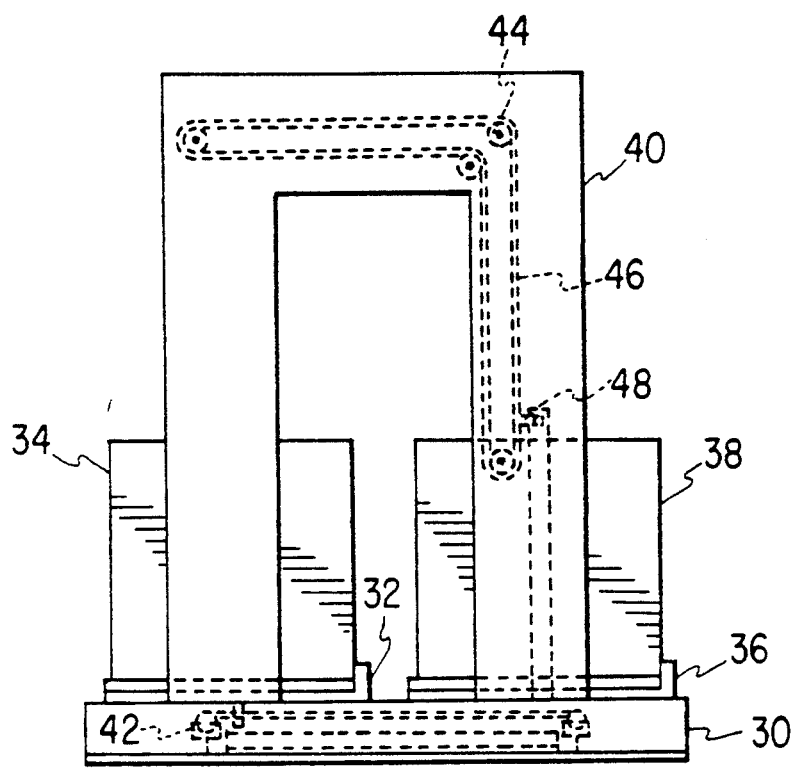
FIG. 3 is a schematic side view of a second embodiment of the invention showing the first carriage in its first position and the second carriage in its first position.
Figure 4:
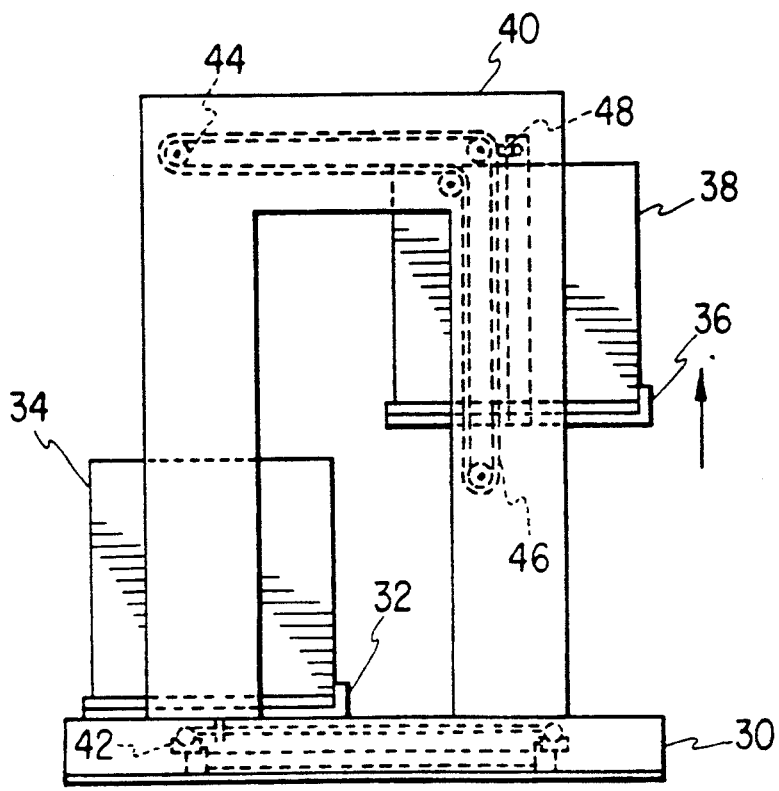
FIG. 4 is a schematic side view of the second embodiment of the invention showing the first carriage in its first position and the second carriage vertically spaced above its first position.

FIGS. 1 and 2 illustrate a first embodiment of the invention. This embodiment is rather similar to the embodiment described in my previously referenced U.S. Pat. No. 5,020,382, and that patent should be consulted for details of the drive means for the two carriages.

The first embodiment comprises a base 10 (which may be fabricated as a part of the assembly including the other components of the invention or which may be part of another facility on which the other components of the invention are mounted), a first carriage 12 (shown carrying a first palletized load 14), a second carriage 16 (shown carrying a second palletized load 18), and a gantry 20.

In use, the first carriage 12 is moved back and forth in a straight line on the base 10 between a first position (shown in FIG. 1) and second position (shown in FIG. 2). Simultaneously, the second carriage 16 is moved back and forth between a first position (shown in FIG. 1) that is at least substantially identical to the second position of the first carriage 12 and a second position (shown in FIG. 2) that is at least substantially vertically spaced from the first position of the first carriage 12. The movements of the first carriage 12 and the second carriage 16 can be (and preferably are) effectuated by the same drive means that are disclosed in my previously referenced prior U.S. patent. These drive means are interrelated such that, when the first carriage 12 is in its first position, the second carriage 16 is in its first position; as the first carriage 12 moves from its first position to its second position, the second carriage 16 moves from its first position to its second position; when the first carriage 12 is in its second position, the second carriage 16 is in its second position; and, as the first carriage 12 moves from its second position to its first position, the second carriage 16 moves from its second position to its first position.

The Second Embodiment

FIG. 3-6 illustrate a second embodiment of the invention. This embodiment is markedly less similar to the embodiment disclosed in my previously referenced U.S. patent. However, the first carriage can be (and preferably is) moved back and forth by the same drive means that are disclosed in that patent, and that patent should, consequently, be consulted for details of the drive means for that carriage.

The second embodiment comprises a base 30 (which also may be fabricated as a part of the assembly including the other components of the invention or which may be part of another facility on which the other components of the invention are mounted), a first carriage 32 (shown carry a first palletized load 34), a second carriage 36 (shown carry a second palletized load 38), and a gantry 40.

Figure 5:
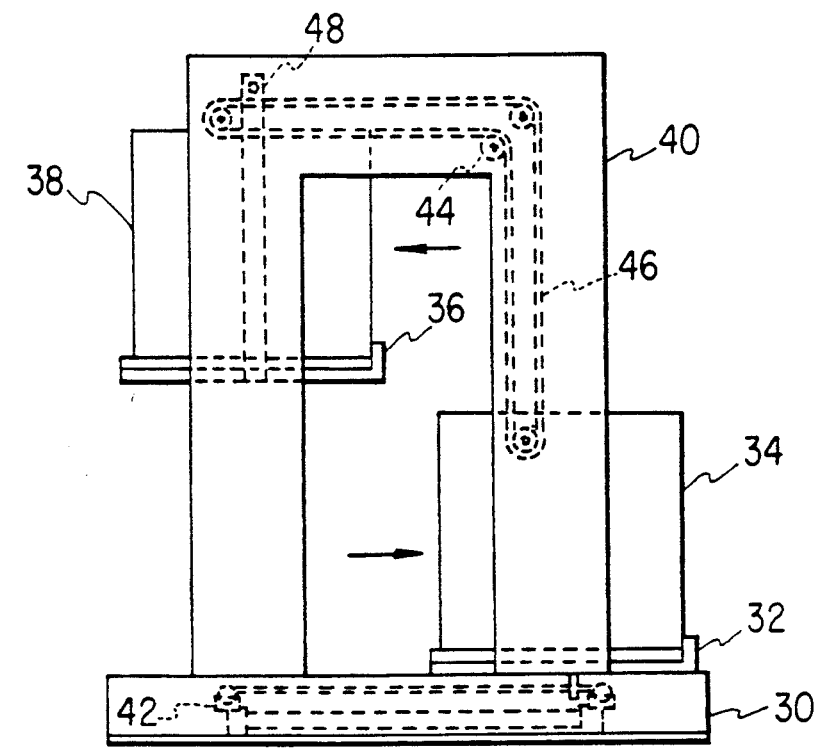
FIG. 5 is a schematic side view of the second embodiment of the invention showing the first carriage in its second position and the second carriage in its second position.
Figure 6:
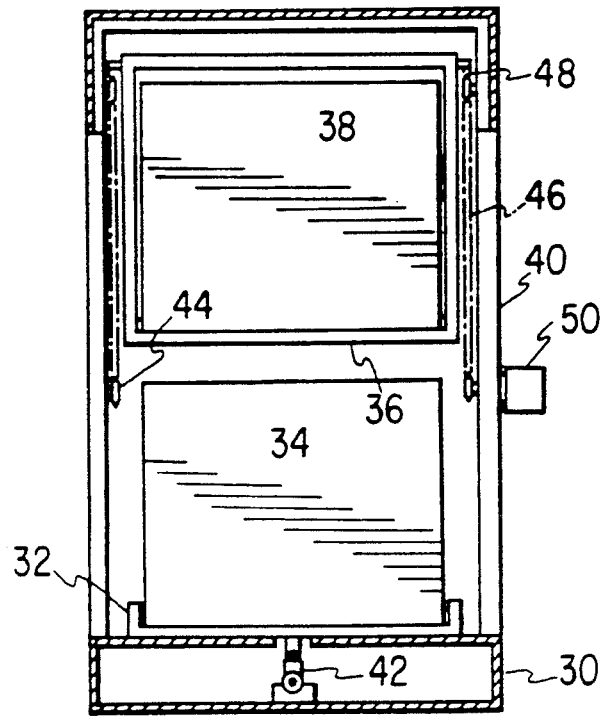
FIG. 6 is a partially cut away end view of the second embodiment of the invention showing the means for moving the two carriages back and forth between their respective first and second positions.

In use, the first carriage 32 is moved back and forth in a straight line on the base 30 between the first position (shown in FIGS. 3 and 4) and a second position (shown in FIG. 5). The second carriage 36 is moved back and forth between a first position (shown in FIG. 3) that is at least substantially identical to the second position of the first carriage 32 and a second position (shown in FIG. 5) that is at least substantially vertically spaced from the first position of the first carriage 32. The movement of the second carriage 36 preferably occurs simultaneously with movement of the first carriage 32 in order to optimize the equipment cycle time. However, simultaneous movement is not necessary from an equipment design point of view.

Movement of the first carriage 32 ca be effectuated by the chain-and-dog arrangement 42 that is disclosed and described in detail in my previously referenced U.S. patent. Movement of the second carriage 36 effectuated by means of a plurality of sheaves 44 mounted on the gantry 40, at least one (preferably two) endless chain 46 trained over the plurality of sheaves 44, means (such as a dog 48) for attaching the second carriage 36 to the endless chain 46, and means (such as a motor 50) for driving the endless chain 46.

As before, the drive means for the first carriage 32 and the drive means for the second carriage 36 are interrelated such that, when the first carriage 32 is in its first position, the second carriage 36 is in its first position; as the first carriage 32 moves from its first position to its second position, the second carriage 36 moves from its first position to its second position; when the first carriage 32 is in its second position, the second carriage 36 is in its second position; and, as the first carriage 32 moves from its second position to its first position, the second carriage 36 moves from its second position to its first position.

Caveat

Obviously, numerous modifications and variations of the present invention are possible in light of the above teachings. It is therefore to be understood that, within the scope of the appended claims, the invention may be practiced otherwise than as specifically described herein.

I claim:

1. Apparatus for loading and unloading objects, said apparatus comprising:
   (a) a base;
   (b) a gantry mounted on said base and projecting upwardly therefrom;
   (c) a first carriage mounted on said base;
   (d) first means for moving said first carriage back and forth in a straight line on said base between a first position and a second position;
   (e) a second carriage mounted on said gantry;
   (f) second means for moving said second carriage back and forth between a first position that is at least substantially identical to the second position of said first carriage and a second position that is at least substantially vertically spaced from the first position of said first carriage; and
   (g) third means for interrelating said first means and said second means such that:
      (i) when said first carriage is in its first position, said second carriage is in its first position;
      (ii) as said first carriage moves from its first position to its second position, said second carriage moves from its first position to its second position;
      (iii) when said first carriage is in its second position, said second carriage is in its second position; and
      (iv) as said first carriage moves from its second position to its first position, said second carriage moves from its second position to its first position.

2. Apparatus as recited in claim 1 wherein said gantry moves relative to said base, carrying said second carriage.

3. Apparatus as recited in claim 1 wherein:
   (a) said gantry is fixed relative to said base and
   (b) said second carriage moves relative to said gantry.

4. Apparatus as recited in claim 3 wherein said second means comprises:
   (a) a plurality of sheaves mounted on said gantry;
   (b) an endless chain trained over said plurality of sheaves;
   (c) means for attaching said second carriage to said endless chain; and
   (d) fourth means for driving said endless chain.

5. Apparatus for loading and unloading objects, said apparatus comprising:
   (a) a base;

(b) a gantry mounted on said base and projecting upwardly therefrom;
(c) a first carriage mounted on said base;
(d) first means for moving said first carriage back and forth in a straight line on said base between a first position and a second position;
(e) a second carriage mounted on said gantry;
(f) second means for moving said second carriage back and forth between a first position that is at least substantially identical to the second position of said first carriage and a second position that is at least substantially vertically spaced from the first position of said first carriage; and
(g) third means for interrelating said first means and said second means such that said first carriage cannot be moved into its second position until after said second carriage has moved out of its first position.

6. Apparatus as recited in claim 5 wherein said gantry moves relative to said base, carrying said second carriage.

7. Apparatus as recited in claim 5 wherein:
(a) said gantry is fixed relative to said base and
(b) said second carriage moves relative to said gantry.

8. Apparatus as recited in claim 7 wherein said second means comprises:
(a) a plurality of sheaves mounted on said gantry;
(b) an endless chain trained over said plurality of sheaves;
(c) means for attaching said second carriage to said endless chain; and
(d) fourth means for driving said endless chain.

9. Apparatus as recited in claim 5 wherein, when one of said carriages moves horizontally, so does the other one of said carriages.

10. Apparatus for loading and unloading objects, said apparatus comprising:
(a) a base;
(b) a gantry mounted on said base and projecting upwardly therefrom;
(c) a first carriage mounted on said base;
(d) first means for moving said first carriage back and forth in a straight line on said base to and between a first and a second position with movement to its second position occurring after a second means has moved a second carriage away from its first position;
(e) a second carriage mounted on said gantry;
(f) second means for moving said second carriage back and forth to and between a first position that is substantially identical to the second position of said first carriage and a second position that is vertically spaced from the first position of said first carriage, with movement to its first position occurring after the first means has moved the first carriage away from its second position.

11. Apparatus as recited in claim 10 wherein said gentry moved relative to said base, carrying said second carriage.

12. Apparatus as recited in claim 10 wherein:
(a) said gentry is fixed relative to the base, and
(b) said second carriage moves relative to said gantry.

13. Apparatus as recited in claim 10 wherein when one of said carriages is moved horizontally, so does the other one of said carriages.

* * * * *